Jan. 16, 1940.  S. S. CRAMER  2,187,017
ELECTRICAL CONDENSER
Filed Dec. 11, 1937  3 Sheets-Sheet 1
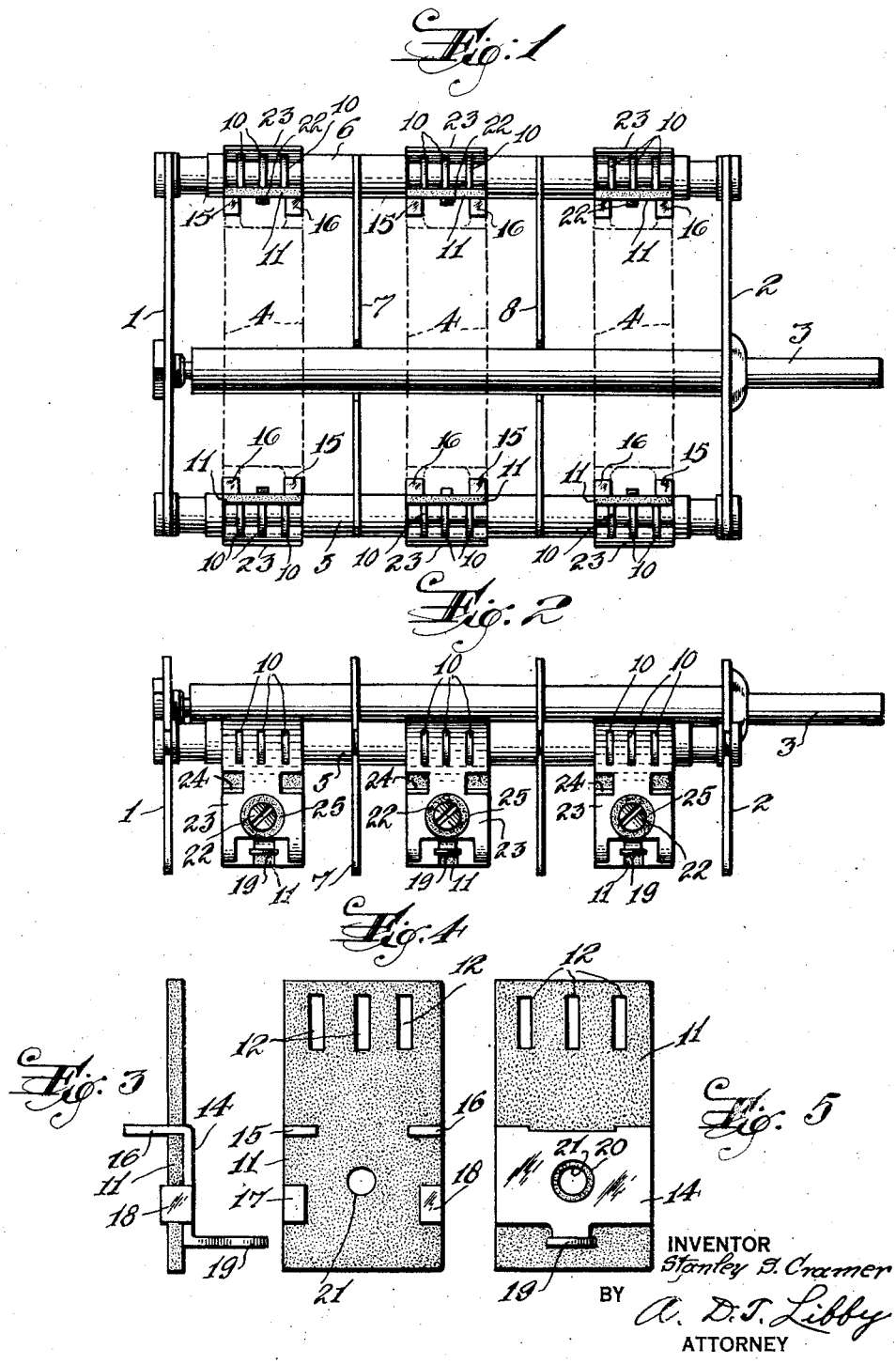

Jan. 16, 1940.  S. S. CRAMER  2,187,017
ELECTRICAL CONDENSER
Filed Dec. 11, 1937  3 Sheets-Sheet 2
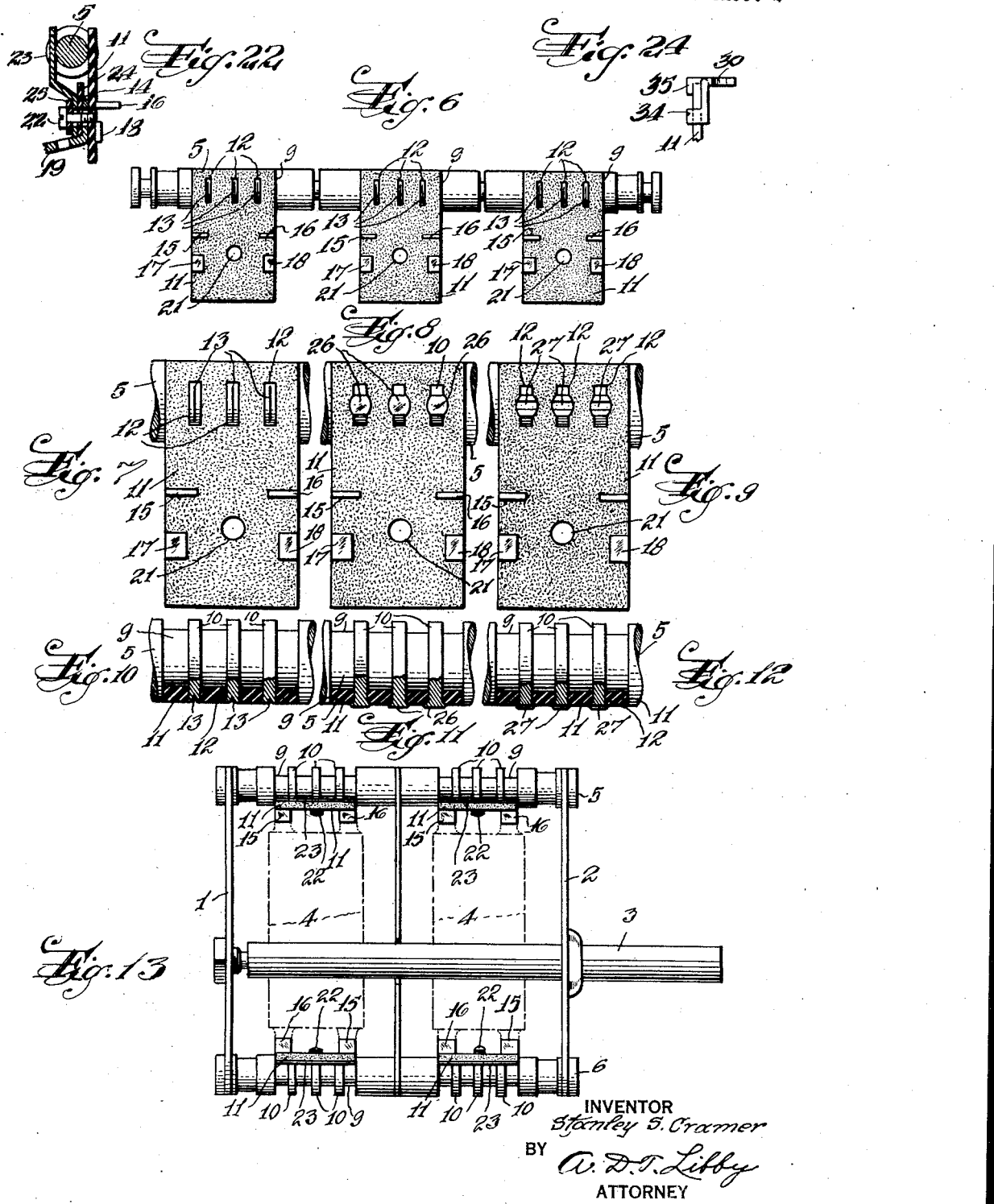
INVENTOR
Stanley S. Cramer
BY
A. D. T. Libby
ATTORNEY Jan. 16, 1940.  S. S. CRAMER  2,187,017
ELECTRICAL CONDENSER
Filed Dec. 11, 1937  3 Sheets-Sheet 3
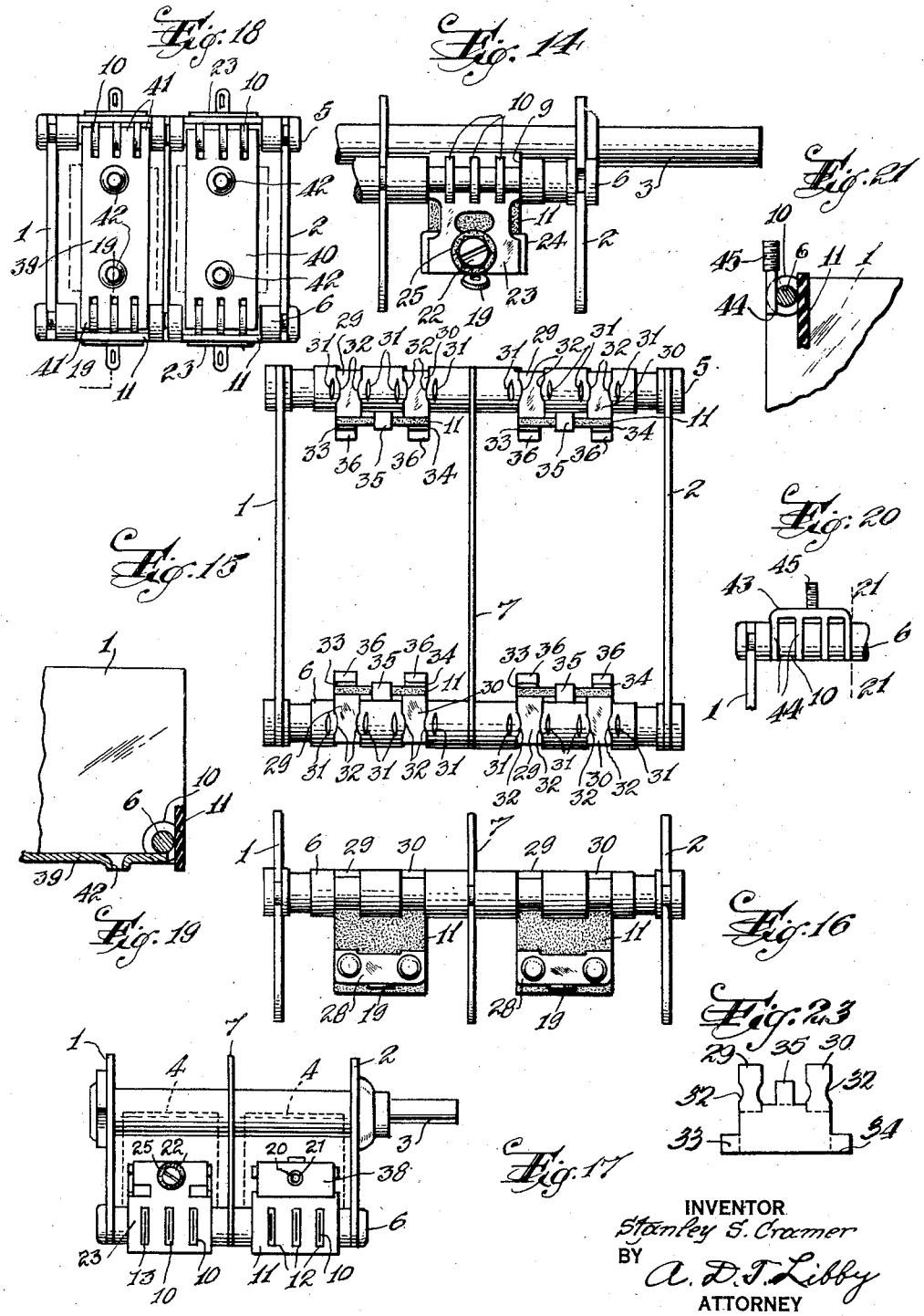
INVENTOR
Stanley S. Cramer
BY
A. D. T. Libby
ATTORNEY Patented Jan. 16, 1940

2,187,017

UNITED STATES PATENT OFFICE 2,187,017

ELECTRICAL CONDENSER

Stanley S. Cramer, Haddon Heights, N. J., assignor, by mesne assignments, to Condenser Development Corporation, Newark, N. J., a corporation of New Jersey Application December 11, 1937, Serial No. 179,227

13 Claims. (Cl. 175—41.5)

This invention relates to improvements in variable electrical condensers such as are used in radio receiving sets. In my Patent No. 2,101,985 issued December 14, 1937, I have pointed out the necessity for making small condenser units and still maintain the necessary capacity for use in connection with the tunable circuits, and at the same time reduce the cost of construction. This patent also shows and describes a certain type of construction of condenser frame which makes it possible to reduce the space between the condenser plate units to reduce the size and yet maintain the desired capacity.

I have also shown and described certain ways and means for mounting the stator units to the frame bars.

My present invention has for one of its objects the further cheapening of the cost of construction of the condenser frame and also to get a cheaper method of mounting the stator units and trimmer plates when used, to the condenser frame.

From the experience gained in making several million unit condensers arranged in gangs or as single units, I have found through the use of a rigid frame such as described in my patent heretofore referred to, that when the "very rigid metallic rods" shown and described in said patent are properly constructed and assembled to the end and shield plates, that there is no need for any auxiliary bars between the end plates, in which case the stator units must be mounted to the rigid frame rods.

In my patent to which reference has been made, I have shown how this may be done by slotting frame rods longitudinally of their length and staking the insulators in position in these slots. This construction takes an extra operation on the rods and thereby increases the expense. My present application is directed to a cheaper and better way of mounting the stators directly to these rigid frame rods.

My invention will be readily understood by reference to the annexed drawings wherein Figure 1 is a plan view of a three-gang condenser showing my new construction applied thereto, the plates of the stator and rotor being merely indicated in position by dotted lines and the view showing one method of mounting a trimmer plate to the various units.

Figure 2 is a side elevation of Figure 1.

Figure 3 is a side elevation of one of the insulators used for supporting a set of stator plates, the stator terminal being mounted thereon.

Figure 4 is a view of Figure 3 looking from left to right.

Figure 5 is a view of Figure 3 looking from right to left.

Figure 6 is a view of a frame rod of the three-gang condenser shown in Figure 1 with the stator supports of Figures 3 to 5 inclusive fastened thereto.

Figure 7 is a view on an enlarged scale showing one method of fastening the insulator carrying the terminal to the frame rod.

Figure 8 is a view similar to Figure 7 but showing a modified form of the fastening means.

Figure 9 is a view similar to Figures 7 and 8 but showing a still further modified form of the fastening means.

Figure 10 is a view looking down at the top of Figure 7 but with the insulator end and portions of the rod shown in section.

Figure 11 is a view similar to Figure 10 of the construction shown in Figure 8.

Figure 12 is a view similar to Figure 10 but of the construction shown in Figure 9.

Figure 13 is a plan view of a two-gang condenser showing a different method of applying a trimmer plate.

Figure 14 is a side elevation of one of the units of the gang condenser of Figure 13.

Figure 15 shows merely, in outline, a frame for a two-gang condenser with a modified form of supporting the stator units from the frame bars.

Figure 16 is a side elevation of Figure 15.

Figure 17 is a side elevation of a two-gang condenser showing a further modified form of construction.

Figure 18 is a bottom view of Figure 17, showing a modified form of construction.

Figure 19 is a partial sectional view on the line 19—19 of Figure 18, the trimmer plate being removed.

Figure 20 is a fragmentary view looking at the bottom of Figure 17, but showing a modified construction.

Figure 21 is a fragmentary view on the line 21—21 of Figure 20.

Figure 22 is a sectional view taken on Figure 2 through one of the frame members and one of the insulators supporting a stator and its trimmer plate.

Figure 23 is a plan view of the blank used in making the metal mounting strip for fastening the stator insulators of Figures 15 and 16 to the frame member.

Figure 24 is a side view of the member shown in Figure 23 formed and attached to its insulator prior to mounting on the frame member.

In the various views wherein like numbers refer to corresponding parts, 1 and 2 are the end plates of a gang condenser. Supported by these end plates is a rotor shaft 3 which carries the usual group of rotor plates which are indicated by the dotted lines 4 which may also illustrate in general the position of the stator plates. The frame members 1 and 2 are fastened together by relatively heavy metallic rods 5 and 6 in the manner as indicated in my Patent No. 2,101,985. Brace and shield plates 7 and 8 are carried by these rods 5 and 6 in the manner indicated. When the rods 5 and 6 are being operated on to provide the grooves for receiving the end plates 1 and 2, they are simultaneously operated on by a suitable tool or tools to cut a plurality of grooves or recesses 9 spaced by the uncut portions 10. Describing now one stator unit, an insulator 11 is provided having a plurality of slots 12 formed therein which are adapted to receive the uncut portions or flanges 10. After the insulator 11 has been placed in position, the shaft is staked in any satisfactory manner, three of which are indicated in Figures 7 to 12 inclusive. In Figures 7 and 10 the staking 13 is what may be termed a line stake. In other words, the shaping tool makes a cut 13 about as indicated in Figures 7 and 10 thereby spreading the metal of the flanges 10 sufficiently to securely grip the side walls of the slots 12 to hold the insulator 11 securely to the frame rod, it being understood that all of the staking operations for each insulator are preformed at once and as a matter of fact the necessary number of insulators may be simultaneously staked to the rod.

Before the insulator 11 is assembled and staked to its respective rod, the stator terminal plate 14 is attached thereto and as shown in Figures 3 to 5 inclusive, the sides of the insulator 11 are slotted to receive inwardly extending fingers 15 and 16 for soldering the stator tie bars thereto. The terminal plate 14 is also provided with clips 17 and 18 which are bent over the edge and in contact with the back side of the insulator 11 as shown in Figures 3 and 4. The terminal plate 14 is also provided with a lug 19 for making electrical contact to the terminal plate. The plate 14 is also provided with a clearance hole 20 to receive an adjusting screw which is adapted to enter a screw threaded hole 21 in the insulator 11, these holes being provided to receive a trimmer plate adjusting screw 22. The plate 14 may, however, be threaded to take the screw 22.

As shown in Figures 1 and 2, a trimmer plate 23 is positioned in the grooves 9 on the opposite side of the rods 5 and 6 from the insulator 11, and staked in position by the flanges 10 in a manner similar to that described with respect to the insulator 11. While I prefer to stake the trimmer plate 23 in position, it may be left unstaked as the adjusting screw 22 will hold it in operative position. As shown in Figure 2, the trimmer plate 23 extends downwardly over the terminal plate 14 but is insulated therefrom by a suitable insulator such as a piece of mica 24 and insulated from the screw 22 by an insulator 25. In the form of assembly shown in Figures 8 and 11, the staking is done by a tool which flattens the flange 10 in a manner somewhat as indicated at 26, while in Figures 9 and 12 the staking is done by flattening as in Figure 8 and at the same time spreading the flattened portion by a longitudinal spreading of the metal as at 27.

By mounting the trimmer plate directly to the frame rod, the trimmer plate is held at ground potential as described in R. E. Cramer application Serial No. 51,591 filed November 26, 1935, so that by this arrangement the shield and brace plates 7 and 8 need not extend beyond the width of the frame for the reason stated in said application.

In Figures 13 and 14 I have shown how the trimmer plate 23 may be mounted on the same side of the frame rods 5 and 6 as the insulator and staked in position when the insulator is attached to these rods.

In Figures 15 and 16 the stator terminal plate 28 is of the type and is fastened to the insulator 11 in a manner similar to that shown in my patent to which reference has been made, but the insulator is fastened to the frame bars 5 and 6 in a somewhat different manner than shown in Figure 6 in that a suitable bracket is fastened to the upper part of the insulator 11. The metallic bracket is provided with arms 29 and 30 which are staked in suitably formed grooves in the rods 5 and 6, the staking operations being indicated at 31, the arms 29 and 30 preferably being formed with recesses 32 when they are made. The bracket has side lugs 33 and 34 which are bent over the edge and back of the insulator 11 and a central lug 35 bent downwardly over the top of the insulator 11. The terminal plate 28 has rearwardly projecting lugs 36 which extend in close proximity to the stator tie bars for soldering thereto which is described in Cramer Patent No. 2,087,902, issued July 22, 1937.

In Figure 17 I have shown a very small compact two-gang unit and in this arrangement the frame rods, only one of which, 5, is shown, are located near the bottom of the end plates 1 and 2, but as has been stated, due to the rigidity of this construction, I have found, for a small unit of this type, that the bar is still rigid enough to maintain the spacing of the condenser plates. In this construction the insulators 11 are staked to the outside of the frame rods rather than at the inside as shown in Figure 1, and the terminal plate 38 is attached to the insulator in the same manner as in Cramer Patent No. 2,087,902. The trimmer plate 23 is shown mounted on one of these units, it being staked on the outside of the insulator 11 and extending upwardly over the terminal plate 38, but insulated therefrom in the manner heretofore described.

In Figures 18 and 19, I have indicated how the condensers, for example that shown in Figure 17, may be mounted in some other manner than from one of the end plates. In this construction a pair of plates 39 and 40, one for each of the condenser units, may have portions cut out to form fingers 41 which may be staked in the grooves 9 in the rods 5 and 6 in a manner similar to the method of attaching the insulators 11 to said rods. The plates 39 and 40 are provided with bosses 42 formed by forcing out the metal sufficiently so that the bosses may be threaded to receive mounting screws. One plate may be used for the two plates 39 and 40, provided the brace and shield plate 7 does not extend below the plane of the rods 5 and 6.

In Figures 20 and 21, spade clips 43, having fingers 44 adapted to be positioned in the grooves 9 and staked therein, act as mounting means for the condenser, since they have threaded shanks 45 adapted to pass through the mounting plate or receive some attachment means.

It will be understood from what has been said that the details for carrying my invention into practice may be varied considerably without departing from the spirit of the same and the scope of the appended claims; for example, in the construction shown in Figures 15 and 16, the metallic arms 29 and 30 may be soldered or otherwise securely fastened to the outer periphery of the rods 5 and 6, and the insulating strip 11 may carry a different form of terminal means for attachment to the stator tiebars.

What I claim is:

1. In an electrical condenser having a frame including end plates fastened together in non-warping relationship by metallic rods disposed one on each side of the frame; means for supporting a stator group of plates, anchored together by tiebars, from said rods, said means comprising longitudinally spaced, arcuately arranged formations in the outer periphery of said rods, insulating strips carrying terminal plates having parts adapted to be fastened to said stator tiebars, and means for anchoring said insulators directly and securely to said formations.

2. Electrical condenser stator mounting means as set forth in claim 1, further defined in that said last-mentioned means includes a metallic bracket fastened to its cooperative insulating strip, the bracket having arms extending into operative position with said formations on the rods and fastened in said position.

3. In an electrical condenser having a frame including end plates fastened together in non-warping relationship by metallic rods disposed one on each side of the frame; means for supporting a stator group of plates, anchored together by tiebars, from said rods, said means comprising longitudinally spaced, arcuately arranged formations on the outer periphery of said rods, insulating strips carrying terminal plates at one end thereof, the plates having parts extending toward the stator tiebars for attachment thereto, the opposite end of said insulating strips having spaced slots therein to cooperate with said rod formations, portions of which enter said slots and adapted to be staked into gripping relation with the material forming said slots.

4. Electrical stator mounting means as set forth in claim 3, further defined in that a trimmer plate may be held in position on at least one of said rods by formations to fit the rod formations, a part of the trimmer extending over the terminal plate but insulated therefrom, with means for adjusting the trimmer plate with respect to said terminal plate.

5. Electrical stator mounting means as set forth in claim 3, further defined in that a trimmer plate may be held in position on at least one of said rods by formations to fit the rod formations, a part of the trimmer extending over the terminal plate but insulated therefrom, with means for adjusting the trimmer plate with respect to said terminal plate, and further defined in that the trimmer plate engages the rod formations on the opposite sides of the rod from that engaged by the insulating strip.

6. Electrical stator mounting means as set forth in claim 3, further defined in that a trimmer plate may be held in position on at least one of said rods by formations to fit the rod formations, a part of the trimmer extending over the terminal plate but insulated therefrom, with means for adjusting the trimmer plate with respect to said terminal plate, and further defined in that the trimmer plate is fastened in position by the same staking operation that fastens the insulating strip to the rod, the staking insuring that the trimmer plate is in contact with the frame or at ground potential.

7. In an electrical condenser having a frame including end plates fastened together in non-warping relationship by metallic rods disposed one on each side of the frame; means for supporting a stator group of plates, anchored together by tiebars, from said rods, said means comprising annular flanges formed by cutting spaced grooves in said rods, insulating strips carrying terminal plates at one end thereof, the plates having parts adapted to be attached to the stator tiebars, the opposite end of the insulating strips having slots therein to receive portions of said rod flanges, the flange portions lying in said slots and being staked so as to grip the insulating strip at the walls of the grooves.

8. Electrical condenser stator mounting means as set forth in claim 7, further characterized in that the insulating strips are fastened to the rods on their surfaces next to the stator, while trimmer plates are positioned on the rods on their outer portions and extend into cooperative relationship with said terminal plates, but insulated therefrom, with means for adjusting the position thereof.

9. Electrical condenser stator mounting means as set forth in claim 7, further characterized in that the insulating strips are fastened to the rods on their surfaces next to the stator, while trimmer plates are positioned on the rods on their outer portions and extend into cooperative relationship with said terminal plates, but insulated therefrom, with means for adjusting the position thereof, and further characterized in that the trimmer plate has its end which engages the rod slotted so as to removably fit the flanges on the rod, so when the adjusting means for the trimmer is removed the trimmer plate can be detached.

10. Electrical condenser stator mounting means as set forth in claim 7, further characterized in that a trimmer plate is staked to a rod when the insulating strip is staked thereto, the trimmer plate extending in cooperative position with the terminal plate, but insulated therefrom, with means for adjusting its position with respect thereto.

11. In an electrical condenser having a frame including end plates fastened together in non-warping relationship by metallic rods disposed one on each side of the frame; means for supporting a stator group of plates, anchored together by tiebars, from said rods, said means including an insulating strip having means at one end for fastening the strip to said tiebars, and having means at the opposite end adapted to be fastened to exterior peripheral portions of said rods by displaced portions thereof.

12. In an electrical condenser having a frame including end plates fastened together in non-warping relationship by metallic rods disposed one on each side of the frame; means for supporting a stator group of plates, anchored together by tiebars, from said rods, said means comprising longitudinally spaced, arcuately arranged formations on the outer periphery of said rods, insulating strips carrying terminal plates having parts adapted to be fastened to said stator tiebars, means for anchoring said insulators into said formations, and means for mounting the condenser frame comprising a metal plate extending transversely across the bottom of the frame and having portions anchored in said arcuately arranged formations on said rods, the plate having means therein to receive mounting holding devices.

13. In an electrical condenser having a frame including end plates fastened together in non-warping relationship by metallic rods disposed one on each side of the frame; means for supporting a stator group of plates, anchored together by tiebars, from said rods, said means comprising longitudinally spaced, arcuately arranged formations on the outer periphery of said rods, insulating strips carrying terminal plates having parts adapted to be fastened to said stator tiebars, means for anchoring said insulators into said formations, and means for mounting the condenser frame comprising metal parts anchored in said arcuately arranged formations and extending so as to engage a mounting support.

STANLEY S. CRAMER.